Aug. 27, 1963
D. M. BROWN ETAL
3,101,793
WRAP GUARD FOR HARROWS AND THE LIKE
Filed Dec. 18, 1961
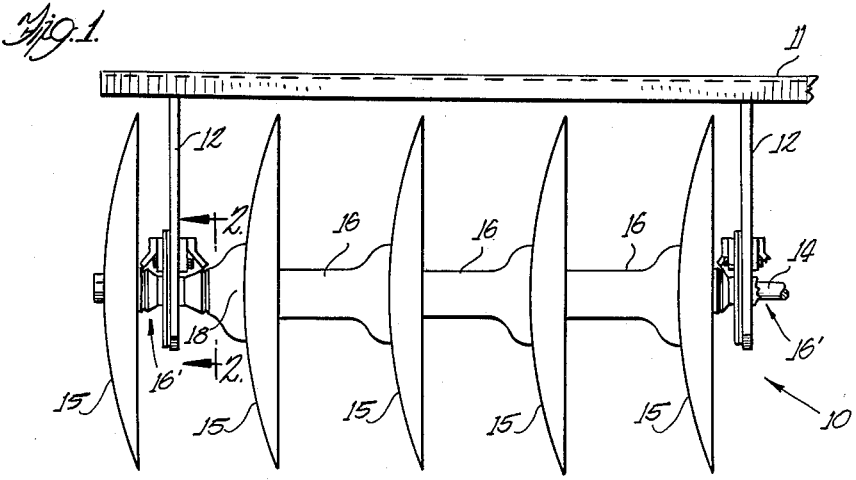
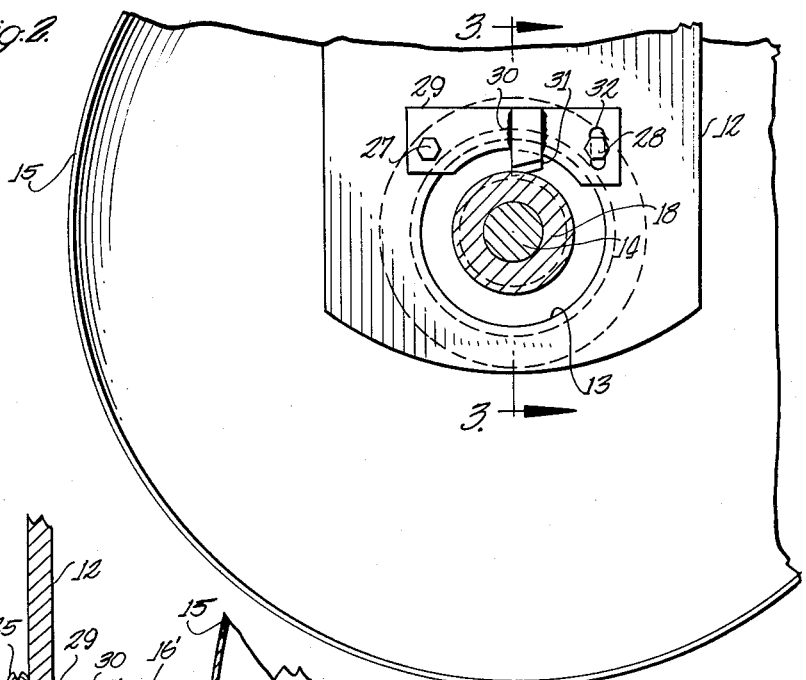
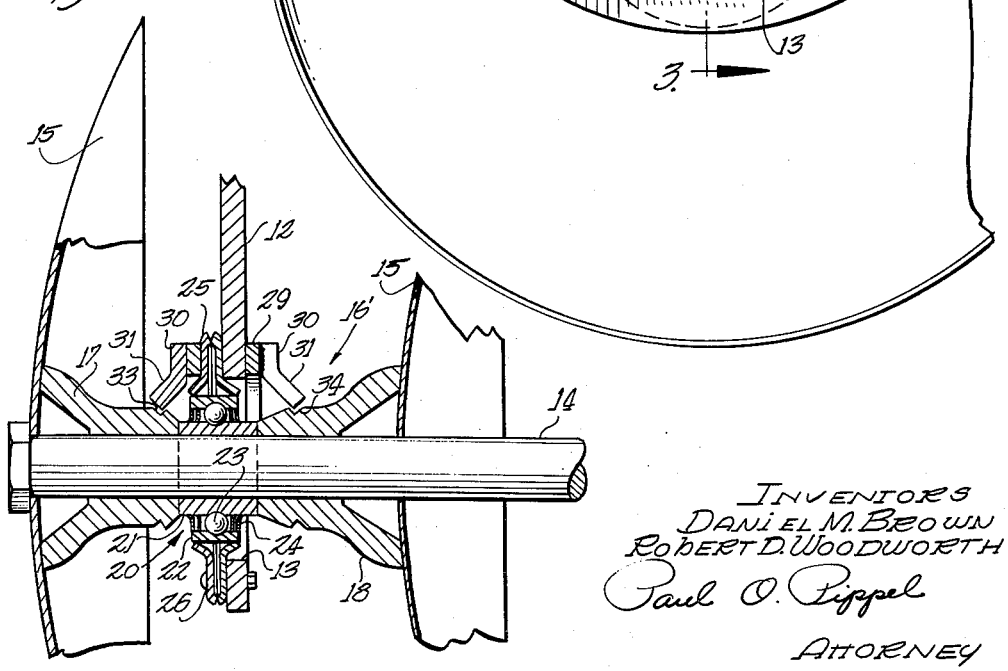
INVENTORS
DANIEL M. BROWN
ROBERT D. WOODWORTH
Paul O. Pippel
ATTORNEY

United States Patent Office 3,101,793
Patented Aug. 27, 1963

3,101,793
WRAP GUARD FOR HARROWS AND THE LIKE
Daniel M. Brown, Villa Park, and Robert D. Woodworth, Clarendon Hills, Ill., assignors to International Harvester Company, Chicago, Ill., a corporation of New Jersey
Filed Dec. 18, 1961, Ser. No. 159,934
8 Claims. (Cl. 172—609)

This invention relates generally to agricultural implements, and more specifically to a wrap guard for a disk harrow gang or the like.

A disk harrow gang comprises a series of axially spaced disks apertured to receive an arbor bolt upon which are also mounted spacer spools separating the disks. The bolt or shaft, the spools, and the disks are rotatable as a unit in bearings carried by certain of the spools and secured to standards depending from a supporting frame. The bearing is usually of the type having exposed sealing rings, and a serious disadvantage has been the tendency for wire, straw, and miscellaneous trash to wrap around the spools, enter the bearing, and damage the seals. The general purpose of the present invention is therefore, to provide in an implement such as a disk harrow or the like, a disk gang which is capable of rotating freely with respect to the implement frame, yet which is not susceptible to damage of the bearing means due to accumulated trash.

A more specific object of the present invention is to provide a disk harrow with a knife member, which cooperates with the means spacing the ground-working tools, to cut the trash as it wraps around the spacer means, before it can damage the bearing assembly.

Another object of the invention is to provide a wrap guard of the type hereinafter described with adjusting means, which allow the knife member to be moved relative to the spacer means to thereby compensate for manufacturing variances and wear.

Other objects and advantages of the invention will hereinafter becomes more fully apparent from the following description of the annexed drawings, which illustrate a preferred embodiment of the invention, and wherein:

FIGURE 1 is a front elevational view of a disk harrow gang embodying the present invention;

FIGURE 2 is a view on an enlarged scale taken along line 2—2 of FIGURE 1, and

FIGURE 3 is a view taken along line 3—3 of FIGURE 2.

Referring now to the drawings, wherein like reference characters designate like or corresponding parts throughout the several views, there is shown in FIGURE 1 a disk harrow gang 10 supported by the laterally extending frame 11 of a disk harrow. A plurality of brackets 12 is mounted on frame 11 in depending relation thereto, and are provided with an aperture 13 adjacent their lower end. Disk supporting shaft or arbor 14 extends through apertures 13, and has mounted at spaced-apart positions therealong a plurality of ground-working disks 15. The ground-working disks 15, which are not adjacent brackets 12, are maintained in their laterally spaced position by spacer members 16, which abut adjacent pairs of disks 15.

Spacer means 16' are provided between the pairs of disks adjacent bracket members 12, and consist essentially of a pair of spaced-apart bell-shaped spool members 17 and 18. The inner race 21 of a bearing assembly 20 is interposed between spools 17 and 18. Bearing assembly 20 further comprises an outer race member 22, a roller element 23, and a plurality of sealing elements 24. Disk gang 10 is secured to frame 11 by pairs of bearing retainers 25, which engage the outer race 22 of bearing assembly 20, and which are secured to brackets 12 by bolts 26 or the like.

It can readily be appreciated from the structure just described, that as gang 10 rotates, wire, straw, and other miscellaneous trash may easily become wrapped about spools 17 and 18. As this trash accumulates around the spools, there is a tendency for it to work its way into bearing assembly 20 and tear out the exposed sealing elements 24. To obviate this problem, the present invention contemplates the use of a novel wrap guard mechanism, which prevents trash from penetrating through to the bearing assembly 20.

The wrap guard includes a knife support 29 pivotally secured to a standard 12 at one end, as by bolt 27 or the like. Knife member 30 is fixedly secured to the intermediate portion of support member 29, and has a blade portion 31 depending therefrom. The other end of support member 29 is provided with a groove 32, which cooperates with bolt 28 to provide means for adjusting the position of knife blade portion 31 with respect to spool members 17 and 18. Circumferentially extending notches or grooves 33 and 34 are provided in the outer periphery of spool members 17 and 18 respectively, and cooperate with blade portions 31 to cut the trash as it approaches bearing assembly 20.

It should be understood that a wrap guard is provided on both sides of each standard 12 to protect bearing assembly 20 from both axial directions. It should also be understood that the distance between blade portion 31, and grooves 33 and 34, may be adjusted by swinging support member 29 around pivot 27 to thereby compensate for the degree of coarseness of trash which is expected to be encountered while traversing a field.

The foregoing disclosure relates to only a preferred embodiment of the invention, and numerous modifications or alterations may be made therein without departing from the spirit and the scope of the invention as set forth in the appended claims.

What is claimed is:

1. In combination with a disk harrow or the like having frame means and at least one disk gang mounted for rotation with respect to said frame means, said disk gang comprising a plurality of spaced-apart ground-working tools, spacer means abutting adjacent pairs of said ground-working tools to maintain said tools in their spaced-apart relation, bracket members depending from said frame means and supporting said gang, and bearing means on the spacer means adjacent said bracket members journalling said gang for rotation with respect to said frame means, a wrap guard comprising at least one knife secured to each of said bracket members, said knives having a blade portion positioned adjacent to said bearing means and disposed in cutting relation with respect to the spacer means adjacent said bracket members to protect said bearing means from trash wrapping around said spacer means.

2. In combination with a disk harrow or the like having frame means and at least one disk gang mounted for rotation with respect to said frame means, said disk gang comprising a plurality of spaced-apart ground-working tools, spacer means abutting adjacent pairs of said ground-working tools to maintain said tools in their spaced apart relation, bracket members depending from said frame means and supporting said gang, and bearing means on the spacer means adjacent said bracket members journalling said gang for rotation with respect to said frame means, a wrap guard comprising at least one support member secured to each of said bracket members, a knife secured to each support member, said knife having a blade portion depending from said support member and positioned adjacent to said bearing means and said blade portions cooperating with the spacer means adjacent said bearing means to protect said bearing means from trash wrapping around said spacer means.

3. The invention set forth in claim 2 wherein a support member and knife are secured to both sides of said bracket members, said knives being disposed on opposite sides of said bearing means.

4. In combination with a disk harrow or the like having frame means and at least one disk gang mounted for rotation with respect to said frame means, said disk gang comprising a plurality of spaced-apart ground-working tools, spacer means abutting adjacent pairs of said ground-working tools to maintain said tools in their spaced-apart relation, bracket members depending from said frame means and supporting said gang, and bearing means on the spacer means adjacent said bracket members journalling said gang for rotation with respect to said frame means, a wrap guard comprising at least one knife mounted on each of said bracket members, said knives being positioned adjacent said bearing means and disposed in cutting relation with respect to the spacer means adjacent said bracket member, and means for adjusting said knives relative to said spacer means, said knives and said spacer means adjacent said bracket members cooperating to protect said bearing means from trash wrapping around said spacer means.

5. The invention set forth in claim 4 wherein said means for adjusting said knives relative to said spacer means includes, support members pivotally secured at one end to said bracket members, said support members having said knives fixedly secured to an intermediate portion thereof, the other end of said support members being provided with locking means for securing said knives in an adjusted position.

6. The invention set forth in claim 5 wherein said locking means includes means for limiting the pivoting movement of said support member.

7. In combination with a disk harrow or the like having frame means and at least one disk gang mounted for rotation with respect to said frame means, said disk gang comprising a plurality of spaced-apart ground-working tools, spacer means abutting said ground-working tools to maintain said tools in their spaced-apart relation, bracket members depending from said frame means and supporting said gang and bearing means operatively associated with the spacer means adjacent said bracket members to journal said gang for rotation with respect to said frame means, the spacer means adjacent said bracket members including a pair of spools mounted in abutting relation to said bearing means, said spools being provided with circumferentially extending grooves, a wrap guard comprising a knife secured to each of said bracket members, said knives having a blade portion disposed in cutting relation with said circumferentially extending grooves to cut trash which wraps around said spools.

8. The invention set forth in claim 7 wherein said bracket members are positioned between adjacent pairs of ground-working tools.

References Cited in the file of this patent
UNITED STATES PATENTS

| | | |
|---|---|---|
| 2,074,418 | Opolo | Mar. 23, 1937 |
| 2,262,654 | Schmeiser | Nov. 11, 1941 |
| 2,737,871 | Rogers | Mar. 13, 1956 |